(12) United States Patent
Chang

(10) Patent No.: US 6,928,540 B2
(45) Date of Patent: Aug. 9, 2005

(54) METHOD AND SYSTEM FOR SYNCHRONIZING A CLOCK FREQUENCY MULTIPLIER WITH A CPU USING A SERIAL INITIALIZATION PACKET PROTOCOL

(75) Inventor: Nai-Shung Chang, Taipei Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 715 days.

(21) Appl. No.: 09/974,559

(22) Filed: Oct. 9, 2001

(65) Prior Publication Data

US 2002/0091960 A1 Jul. 11, 2002

(30) Foreign Application Priority Data

Nov. 20, 2000 (TW) ........................................ 89124512 A

(51) Int. Cl.[7] .............................................. G06F 9/00
(52) U.S. Cl. .............................. 713/1; 713/2; 713/100
(58) Field of Search ........................... 713/1, 2, 3, 400, 713/100; 714/23

(56) References Cited

U.S. PATENT DOCUMENTS 5,862,351 A * 1/1999 He ............................... 710/104
6,269,443 B1 * 7/2001 Poisner et al. ................. 713/1

OTHER PUBLICATIONS

"AMD Duron Processor Data Sheet", Sep. 2000, pp. 33–35.*

* cited by examiner

Primary Examiner—Thuan Du
Assistant Examiner—Paul Yanchus, III
(74) Attorney, Agent, or Firm—J.C. Patents

(57) ABSTRACT

A system and a method capable of automatically reading out the multiple value of clock frequency on system bus are provided. The system includes a central processing unit and a chipset. The central processing unit has a storage unit for holding a multiple value of clock frequency. The storage unit is capable of synchronizing with an external device through a serial initialization packet (SIP) protocol. The chipset attempts to synchronize with the central processing unit in a SIP protocol that uses a preset multiple value of clock frequency as a parameter. If synchronization between the central processing unit and the chipset cannot be established, the preset multiple value of clock frequency is changed and the SIP protocol is executed again. The multiple value of clock frequency is reset until synchronization is established. After synchronization, the multiple value of clock frequency in the central processing unit is retrieved and compared with the preset multiple value of clock frequency. If the retrieved multiple value of clock frequency is different from the preset value in the chipset, the preset value is replaced by the retrieved value.

14 Claims, 4 Drawing Sheets

METHOD AND SYSTEM FOR SYNCHRONIZING A CLOCK FREQUENCY MULTIPLIER WITH A CPU USING A SERIAL INITIALIZATION PACKET PROTOCOL

CROSS-REFERENCE TO RELATED APPLICATION

This application claims the priority benefit of Taiwan application serial no. 89124512, filed Nov. 20, 2000.

BACKGROUND OF THE INVENTION

1. Field of Invention

The present invention relates to a system for determining the multiple value of clock frequency from system bus. More particularly, the present invention relates to a system capable of automatically reading out the multiple value of clock frequency from system bus.

2. Description of Related Art

There are a number of conventional techniques for selecting the multiple value of clock frequency from PC system bus. The most common technique is to set up a plurality of jumpers on a computer main board. By setting the pin connections of these jumpers manually, the multiple value of clock frequency used by the main board can be adjusted accordingly. One major drawback of this method is that the relationship between the method of interconnecting various pins and the multiple value of clock frequency must be memorized. Otherwise, a user may have to find such information from related documents first before the multiple value of clock frequency can be correctly set. Hence, this type of design is not too user friendly and may cause a lowering of performance.

To resolve the problem, a basic input/output system (BIOS) may be used to provide simple method of selecting clock frequency. The BIOS method utilizes software instead of hardware to control the selection so that the main board may be able to use the correct multiple value of clock frequency. Although the software method can eliminate some of the inconveniences in a manual setting system, imperfections still exist. For example, if the central processing unit (CPU) of a computer is locked up to operate only at a definite clock frequency or locked up to operate only within a range of clock frequencies, the user needs to consult a brochure about the CPU before a multiple value of clock frequency suitable for operating the system can be found.

To facilitate the selection of the multiple value of clock frequency, conventional techniques also provide an automatic selection method. In this method, the CPU provides a storage unit to hold the multiple value of clock frequency used by the CPU. The multiple value of clock frequency is broadcast to outside the system via one of the pins. The chipset responsible for determining the correct clock frequency of the main board is able to find out the correct multiple value of clock frequency by receiving the broadcast from the CPU. FIG. 1 is a block diagram showing a conventional method of automatically finding a multiple value of clock frequency through connections between a CPU and a chipset. As shown in FIG. 1, the multiple clock frequency value is stored in a storage unit 125 inside the CPU 120. Through one of CPU's outlet pins, the multiple value of clock frequency can be transferred from the outlet pin of the CPU 120 via circuit lines 140, 142, 144 and 146 to a chipset 130. Table 1 is a listing of the relationship between multiple values of clock frequency and various combinations of pin potentials.

TABLE 1

| FID [3] | FID [2] | FID [1] | FID [0] | Multiple value of Clock Frequency |
|---|---|---|---|---|
| 0 | 0 | 0 | 0 | Retained |
| 0 | 0 | 0 | 1 | Retained |
| 0 | 0 | 1 | 0 | Retained |
| 0 | 0 | 1 | 1 | 4.5 |
| 0 | 1 | 0 | 0 | 5 |
| 0 | 1 | 0 | 1 | 5.5 |
| 0 | 1 | 1 | 0 | 6 |
| 0 | 1 | 1 | 1 | 6.5 |
| 1 | 0 | 0 | 0 | 7 |
| 1 | 0 | 0 | 1 | 7.5 |
| 1 | 0 | 1 | 0 | 8 |
| 1 | 0 | 1 | 1 | Retained |
| 1 | 1 | 0 | 0 | Retained |
| 1 | 1 | 0 | 1 | Retained |
| 1 | 1 | 1 | 0 | Retained |
| 1 | 1 | 1 | 1 | Retained |

In Table 1, FID [0] to FID [3] represents the pins on the CPU 120. A value of '0' in the corresponding pin indicates a low potential at that pin. Conversely, a value of '1' in the corresponding pin indicates a high potential at that pin. By probing the potentials of all four pins, the multiple value of clock frequency stored inside the storage unit 125 of the CPU 120 can be found.

Although this arrangement is much simpler than the previous two methods, extra pins in the chipset 130 are needed to receive information regarding the multiple value of clock frequency from the CPU 120. Since the chipset needs to provide many other powerful functions, pins are always in demand. Hence, the last method is likely to aggravate chipset's pin shortage problem.

In brief, major defects in conventional techniques includes:

1. The adjustment of the multiple value of clock frequency to be used by the main board through the manual setting of jumpers is not very user-friendly. Operating efficiency is likely to be compromised.

2. Adjustment of the multiple value of clock frequency through software control is convenient. However, the user needs to consult a CPU brochure to set the multiple value of clock frequency for normal operation when the clocking frequency value of the CPU is locked or the CPU is permitted to use only a few frequencies.

3. The method of broadcasting the multiple value of clock frequency from a CPU to a chipset so that the chipset can select the proper operating frequency for the main board is convenient. However, additional pins are required to receive CPU signals, hence aggravating the chipset's pin shortage problem.

SUMMARY OF THE INVENTION

Accordingly, one object of the present invention is to provide a system capable of automatically reading out the multiple values of clock frequency from system bus. The system includes a central processing unit and a chipset. The central processing unit has a storage unit for holding a multiple value of clock frequency. The storage unit is capable of synchronizing with an external device through a serial initialization packet (SIP) protocol. The chipset attempts to synchronize with the central processing unit by a SIP protocol that uses a preset multiple value of clock frequency as a parameter. If synchronization between the central processing unit and the chipset cannot be established, the multiple value of clock frequency is changed and the SIP protocol is re-executed. The multiple value of clock frequency is reset until synchronization is established. After synchronization, the multiple value of clock frequency in the central processing unit is retrieved and compared with the preset multiple value of clock frequency. If the retrieved multiple value of clock frequency is different from the preset value in the chipset, the preset value is replaced by the retrieved value.

This invention also provides a method for automatically reading-out the multiple value of clock frequency from system bus. The method can be applied to set up the operating frequency between a central processing unit and a system bus. The central processing unit provides a multiple value of clock frequency. First, a multiple value of clock frequency is selected. The preset multiple value of clock frequency is used as a parameter in a serial initialization packet (SIP) protocol. The SIP protocol is executed and synchronization with the central processing unit is attempted. If synchronization cannot be established, the preset multiple value of clock frequency is changed and a fresh attempt for synchronization using the SIP protocol is conducted. This process is repeated until synchronization is established. After synchronization, the multiple value of clock frequency is read from the central processing unit and compared with the preset multiple value of clock frequency. If the two values are different, the preset multiple value of clock frequency is modified to the one used by the central processing unit.

This invention also provides an alternative method for automatically reading out the multiple value of clock frequency from system bus. The method can be applied to set up operating frequency between a central processing unit and a system bus. First, a counting value is set. According to the counting value, a multiple value of clock frequency is selected. Using the preset multiple value of clock frequency as a parameter in a serial initialization packet (SIP) protocol, the SIP protocol is executed and synchronization with the central processing unit is attempted. If the central processing unit and the system bus are not synchronized, the counting value is changed. The modified counting value is used to select a new multiple value of clock frequency. The SIP protocol is executed again. The process is repeated until synchronization between the central processing unit and the system bus is established. After synchronization, the multiple value of clock frequency is read from the central processing unit and compared with the preset multiple clock frequency. If the two multiple clock frequencies are different, the preset multiple clock frequency is changed to the one used by the central processing unit.

In brief, this invention utilizes incremental changes of the preset multiple value of clock frequency to probe for the actual multiple value of clock frequency used by a central processing unit. With this clocking frequency probing scheme, the pin positions in the chipset reserved for receiving signals transmitted from the central processing unit regarding the multiple value of clock frequency are no longer required. Ultimately, the freed-up pins in the chipset can be used to promote some other functions.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
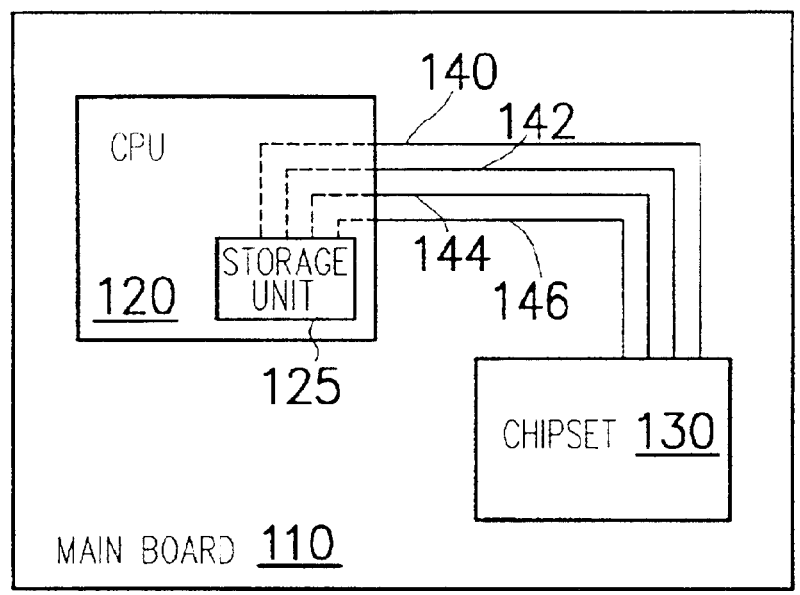
FIG. 1 is a block diagram showing a conventional method of automatically finding a multiple clock frequency value through connections between a CPU and a chipset.

Reference will now be made in detail to the present preferred embodiments of the invention, examples of which are illustrated in the accompanying drawings. Wherever possible, the same reference numbers are used in the drawings and the description to refer to the same or like parts.

Figure 2:
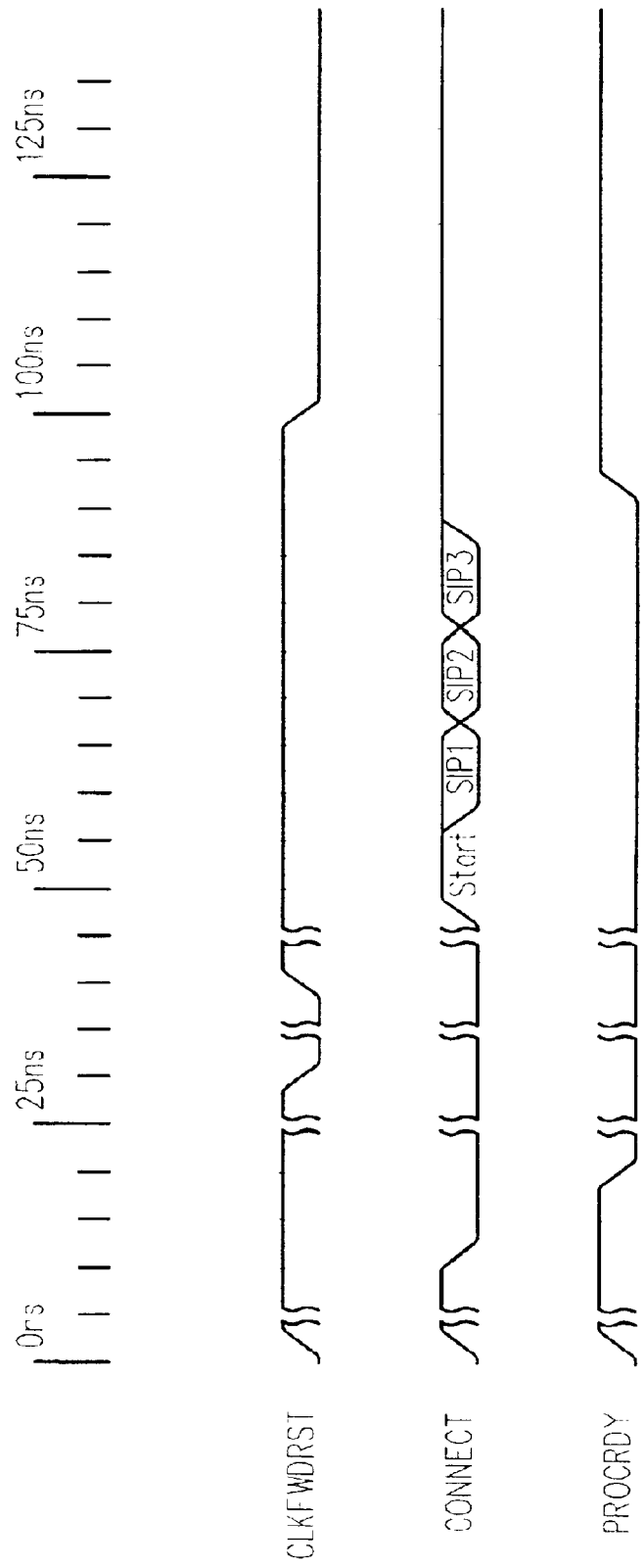
FIG. 2 is a timing diagram showing some of the signals used in serial initialization packet (SIP) protocol.

To simplify the explanation of this invention, the following is a general introduction to serial initialization packet (SIP) protocol. FIG. 2 is a timing diagram showing some of the signals used in serial initialization packet (SIP) protocol. According to the SIP protocol, a central processing unit during initialization will de-assert the signal line PROCRDY (at 20 ns). In the meantime, another signal line CLKFW-DRST is maintained in an assert state. The signal line PROCRDY submits a signal to the system. The signal is used for power management and clock-forward initialization during reset. The signal line CLKFWDRST is used for supplying a signal to reset the system and a signal to the clock-forward initialization circuit inside the processor.

A few system clock cycles (SYSCLK) after the signal line PROCRDY is de-asserted, the main board will de-assert the signal line CLKFWDRST (at about 30 ns). Similarly, a few system clock cycles (SYSCLK) after the signal line CLK-FWDRST is de-asserted, the system will reassert the signal line CLKFWDRST (at about 40 ns).

In the period when the signal line CLKFWDRST is in the assert state, the central processing unit will wait to receive a start bit specified according to SIP protocol. During this period (between 55 ns to 90 ns in this embodiment), the main board will transfer the SIP that includes processor clock-forwarding initialization state to the central processing unit via the signal line CONNECT. The signal line CONNECT is supplied by the system. The signal line CONNECT provides signals for power management and clock-forward initialization during reset. After the transmission of the SIP, the main board will maintain the signal line CONNECT in the assert state to indicate the end of the transmission of the SIP to the central processing unit. On receiving the SIP, the central processing unit will assert the signal line PROCRDY (at between 90 to 95 ns) to indicate the completion of initialization and ready for data processing.

However, if no SIP is received by the central processing unit when the signal line CLKFWDRST is asserted, the central processing unit will not assert the signal line PROCRDY. Under such circumstances, the assertion and de-assertion of the signal line CLKFWDRST will have to be repeated and the entire computer system will hang.

Figure 3:
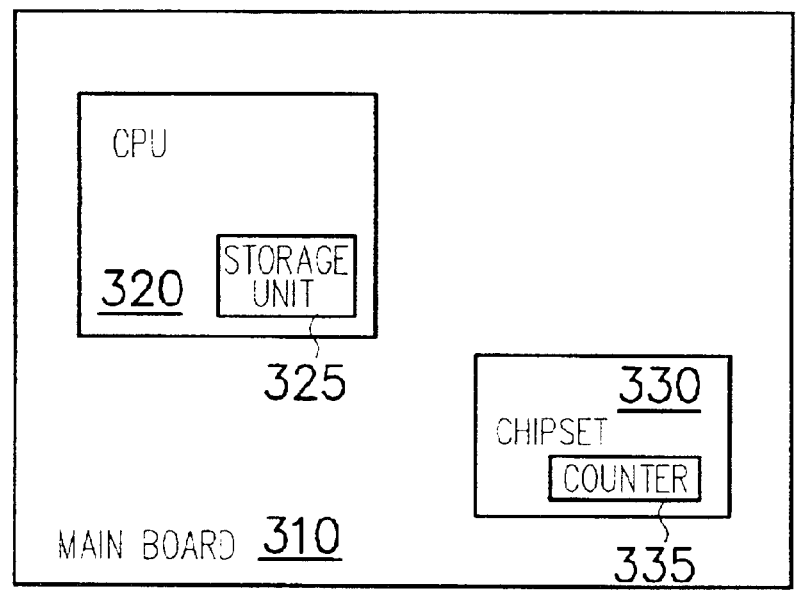
FIG. 3 is a block diagram showing the system components on a main board according to one preferred embodiment of this invention.

FIG. 3 is a block diagram showing the system components on a main board according to one preferred embodiment of this invention. As shown in FIG. 3, a central processing unit 320 and a chipset 330 are installed on a main board 310. The chipset 300 includes a counter 335. And, The counter is not a critical component because the counter 335 can be installed elsewhere.

The central processing unit 320 further includes a storage unit 325. A multiple value of clock frequency is stored inside the storage unit 325. In initializing the system, the central processing unit 320 will have to synchronize with external devices using a serial initialization packet (SIP) protocol. Through the selection of a multiple value of clock frequency to serve as a parameter for the SIP protocol, the chipset 330 attempts to synchronize with the central processing unit 320. If synchronization fails, the chipset 330 automatically changes the preset multiple clock frequency to a new value and re-executes the SIP protocol. The process is repeated until synchronization occurs. On synchronization, the chipset 330 reads out the multiple value of clock frequency from the storage unit 325 and compares it with the preset multiple value of clock frequency. If the two values are different, the preset multiple value of clock frequency is modified to the one used by the central processing unit 320.

The synchronization between the chipset 330 and the central processing unit 320 is determined by the response from the central processing unit 320. For example, when the central processing unit has not asserted the signal line PROCRDY within a pre-defined time period, failure of the chipset under the present multiple value of clock frequency with the central processing unit 320 is assumed. However, that the central processing unit 320 responds to the chipset 330 within the pre-defined period does not mean the selected multiple value of clock frequency in the chipset 330 is the correct one. During the initialization of the central processing unit 320, the few system clock cycles between asserting and de-asserting the signal line CLKFWDRST are used for receiving the SIP to complete the initialization procedure. Hence, when the preset multiple value of clock frequency is not far away from the correct value, the central processing unit 320 may accept the value to complete the initialization procedure. For example, if the exact multiple value of clock frequency is 4, a preset multiple value of clock frequency is accepted around 2.5, 4 or 4.5.

After a preset multiple value of clock frequency is accepted in the initialization of the central processing unit 320, the actual multiple value of clock frequency must be retrieved from the storage unit 325 of the central processing unit 320. The retrieved value is compared with the preset multiple value of clock frequency so that any discrepancy between the two values can be modified.

The counter 335 is a device for changing a counting value. As shown in Table 1, if SIP protocol fails to synchronize when the initial counting value is 6 with a corresponding multiple clock frequency value 6, the counter 335 may increment or decrement the counting value by 1 (the value in each increment or decrement need not be 1). With the new counting value, the preset multiple clock frequency value to be used in the next SIP protocol may be incremented to 6.5 or decremented to 5.5 (the value can be incremented to 7 or decremented to 5).

Figure 4:
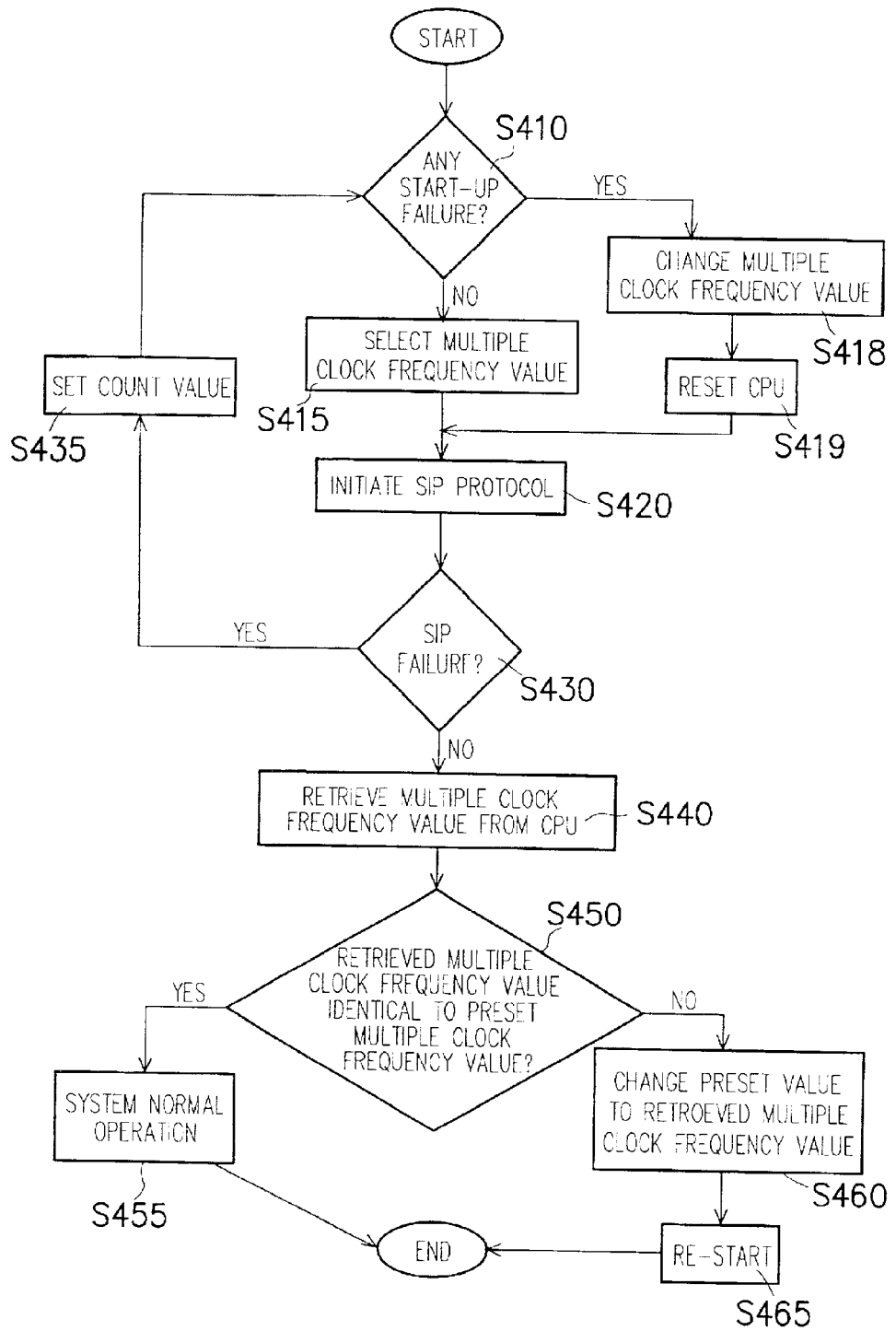
FIG. 4 is a flow chart showing the progression of steps for finding the multiple value of clock frequency to be used in a system bus according to a first preferred embodiment of this invention.

FIG. 4 is a flow chart showing the progression of steps for finding the multiple clock frequency value to be used in a system bus according to a first preferred embodiment of this invention. The method can be applied to synchronize between a central processing unit and a system bus. In step S410, any start-up failures are examined. If there is no start-up failure, a multiple clock frequency value is selected in step S415. However, if start-up failure has occurred, the previously preset multiple value of clock frequency is modified accordingly in step S418. In step S419, the central processing unit (CPU) is reset. In step S420, the selected multiple value of clock frequency is used as a parameter in the SIP protocol and attempts at synchronization with the central processing unit are made.

If response from the central processing unit is not received after a pre-defined period in step S430, the attempted synchronization of the central processing unit and the system bus using the SIP protocol with the preset multiple value of clock frequency is assumed to be a failure. Hence, the counting value is changed in step S435 and control is returned to step S410 again.

If the central processing unit and the system bus are found to synchronize in step S430, the multiple value of clock frequency in the CPU is retrieved in step S440. In step S450, the retrieved multiple value of clock frequency and the preset multiple value of clock frequency are compared. If the two values are different, the preset multiple value of clock frequency is modified to the one used by CPU in step S460. In step S465, the computer is re-started again. On the other hand, if the two multiple values of clock frequency are already identical, normal operation resumes.

Figure 5:
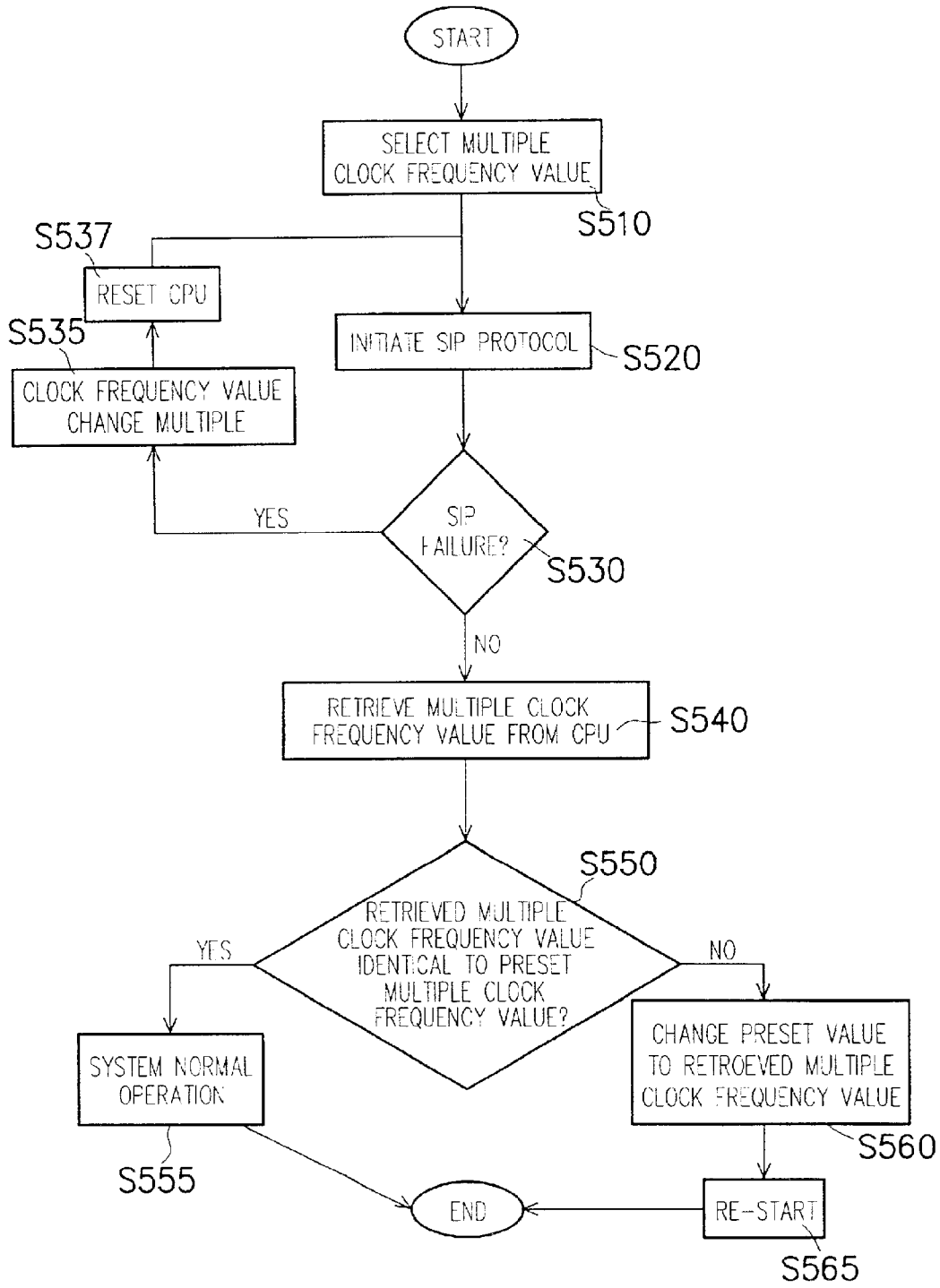
FIG. 5 is a flow chart showing the progression of steps for finding the multiple value of clock frequency to be used in a system bus according to a second preferred embodiment of this invention.

FIG. 5 is a flow chart showing the progression of steps for finding the multiple value of clock frequency to be used in a system bus according to a second preferred embodiment of this invention. In step S510, a multiple value of clock frequency is selected. In step S520, the preset multiple value of clock frequency is used as a parameter in the SIP protocol and an attempt to synchronize with the central processing unit is made.

If the central processing unit produces no response after a pre-defined period, no synchronization between the central processing unit and the system bus under the preset multiple value of clock frequency is assumed in step S530. In other words, the SIP protocol is assumed to fail. A new multiple value of clock frequency is selected to replace the original value in step S535. The CPU is reset in step S537 and then control is returned to step S520 again.

On the other hand, if the central processing unit and the system bus are found to synchronize in step S530, the multiple value of clock frequency is retrieved from the CPU in step S540. In step S550, the retrieved multiple value of clock frequency and the preset multiple value of clock frequency are compared. If the two values are different, the preset multiple value of clock frequency is modified to the one used by CPU in step S560. In step S565, the computer is re-started again. On the other hand, if the two multiple values of clock frequency are already identical, normal operation resumes.

Note that in this invention, the initial selection of the multiple value of clock frequency can be any permitted value. Subsequent multiple values of clock frequency can then be chosen by some means, including incrementing in step (for example, from 3.5 to 4 and then to 4.5, decrementing in step (for example, from 4.5 to 4 and then to 3.5), or jumping steps (for example, from 3 to 4 and then to 5).

In conclusion, one major advantage of this invention is the elimination of pins in a chipset for receiving the multiple value of clock frequency from a central processing unit. The freed-up pin positions in the chipset can be used to perform some other functions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system capable of automatically reading-out a multiple value of clock frequency from system bus, comprising:

a central processing unit having a storage unit therein, wherein said storage unit holds a multiple value of clock frequency, and wherein said central processing unit is capable of synchronizing with an external device according to a serial initialization packet (SIP) protocol; and a chipset, wherein said chipset is capable of repeatedly selecting a multiple value of clock frequency to serve as a parameter in a serial initialization packet protocol until a synchronizing multiple clock frequency is found.

2. The system of claim 1, wherein said system further including a counter is capable of generating a new counting value after each failed attempting to synchronize.

3. The system of claim 2, wherein said multiple value of clock frequency is changed by according to said counting value.

4. The system of claim 1, wherein said multiple value of clock frequency is selected and said serial initialization packet protocol is executed again, when said chipset cannot be synchronizing with said central processing unit, otherwise, said multiple value of clock frequency is retrieved from said central processing unit and compared with said selected multiple value of clock frequency, and if said two values are different, said preset multiple value of clock frequency is replaced by said value sent from said central processing unit.

5. The system of claim 4, wherein said central processing unit is reset before said serial initialization packet protocol is executed again.

6. The system of claim 4, wherein said system further including a counter is capable of generating a new counting value after each failed attempt to synchronize.

7. The system of claim 6, wherein said multiple value of clock frequency is changed by according to said counting value.

8. A method of automatically reading-out a multiple value of clock frequency between a central processing unit and a system bus, wherein said central processing unit provides said multiple value of clock frequency, comprising said steps of:

selecting a multiple value of clock frequency;

using said preset multiple value of clock frequency as a parameter in serial initialization packet protocol; and executing said serial initialization packet protocol and attempting to synchronize with said central processing unit by varying said preset multiple value of clock frequency.

9. The method of claim 8, wherein said method further includes generating a new counting value after each failed attempting to synchronize.

10. The method of claim 9, wherein said multiple value of clock frequency is changed by according to said counting value.

11. The method of claim 8, wherein said step of varying said preset multiple value of clock frequency includes said sub-steps of:

changing said preset multiple value of clock frequency when synchronization fails, using said modified multiple value of clock frequency to serve as a parameter in a serial initialization packet protocol, re-executing said protocol and repeating this step until synchronization is obtained;

retrieving said multiple value of clock frequency from said central processing unit when synchronization is successful; and comparing said retrieved multiple value of clock frequency with said preset multiple value of clock frequency, if said two values are different, said preset multiple value of clock frequency is replaced by said retrieved value.

12. The method of claim 11, wherein said central processing unit is reset before said serial initialization packet protocol is executed again.

13. The method of claim 11, wherein said method further includes generating a new counting value after each failed attempting to synchronize.

14. The method of claim 13, wherein said multiple clock frequency value is changed by according to said counting value.

* * * * *